Feb. 12, 1952     J. R. TURNER ET AL     2,585,287
APPARATUS FOR CHUCKING BLOCKS OF
LENSES ON GENERATING MACHINES

Filed Jan. 13, 1949     2 SHEETS—SHEET 1

JOHN R. TURNER
JOSEPH A. PELLMAN
INVENTORS

BY

ATTORNEYS

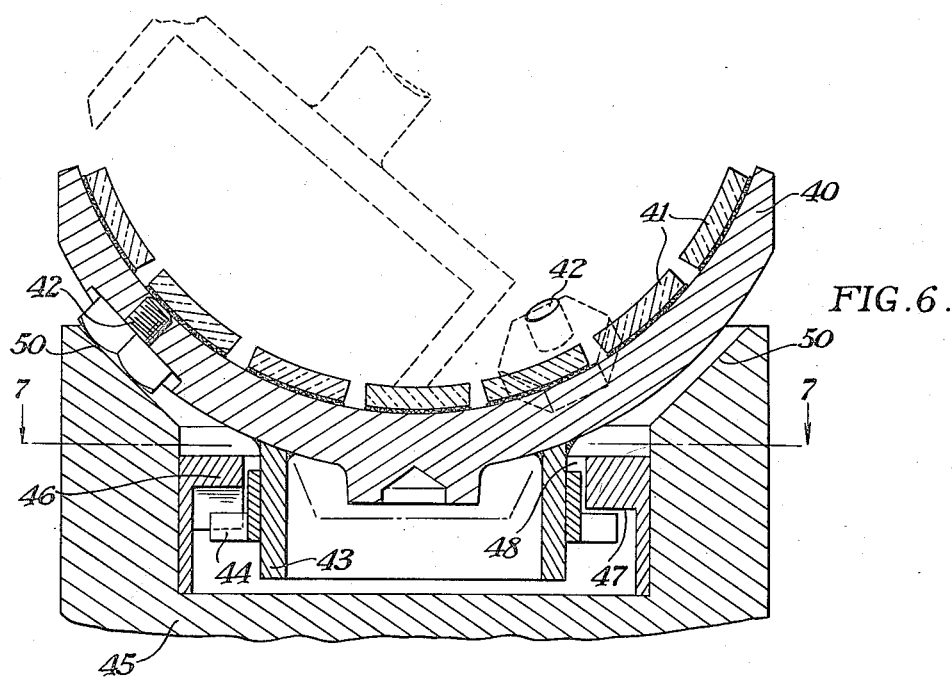
FIG. 6.
FIG. 7.
FIG. 8.
JOHN R. TURNER
JOSEPH A. PELLMAN
INVENTORS
BY
ATTORNEYS
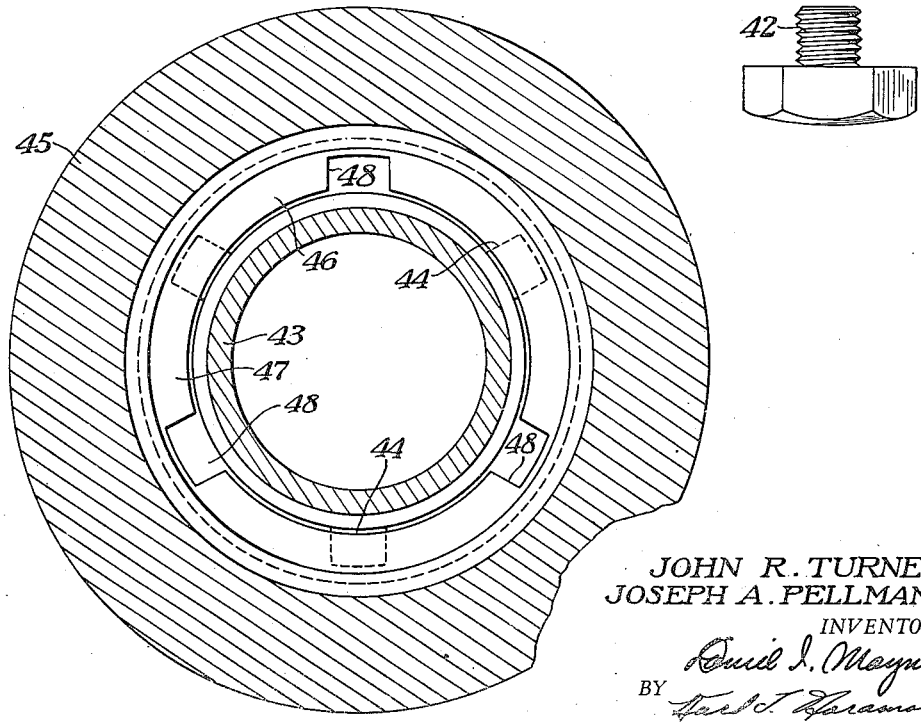

Patented Feb. 12, 1952

2,585,287

UNITED STATES PATENT OFFICE 2,585,287

APPARATUS FOR CHUCKING BLOCKS OF LENSES ON GENERATING MACHINES

John R. Turner and Joseph A. Pellman, Rochester, N. Y., assignors to Eastman Kodak Company, Rochester, N. Y., a corporation of New Jersey Application January 13, 1949, Serial No. 70,694

10 Claims. (Cl. 51—216)

1

The present invention relates to apparatus for generating a curve on each of a group of lenses and particularly to apparatus for chucking a block of lens blanks on the spindle of a lens-generating machine.

In conventional lens-grinding machines, in which a block of lenses mounted on a rotating spindle is abraded by an oscillating tool while a solution of abrasive and liquid is fed between the tool and the work, the blocking tool need not be located on the grinding spindle with any great accuracy, since the grinding tool is not rigidly located with respect to the grinding spindle. However, when a generating machine is used, wherein the block of lenses is rotated on a spindle and operated on by a rotating annular tool or wheel, having the abrasive impregnated therein, i. e., diamond wheels, and the axis of the tool is fixed at an angle to that of the work spindle in accordance with the curvature to be generated, the problem of chucking the block of lenses on the work spindle is critical. The grinding of a block of lenses on a generating machine requires that the block be positioned on the spindle with locating errors no greater than the permissible thickness and/or prismatic tolerances for the individual lenses.

One object of the present invention is to provide an apparatus for locating and clamping a block of lenses on the work spindle of a generating machine which will hold the blocks of lenses accurately and securely on the work spindle, but will permit the block to be removed and replaced on the spindle readily.

Another object is to provide means for chucking a block of lenses on the work spindle which minimizes the danger of positioning errors due to dirt or pitch on the locating surfaces and which permits ready replacement or correction of the locating elements after wear has occurred.

A further object is to provide a chucking means for a block of lenses in which the chucking surfaces are concentric to the curve to be generated on the lens-generating machine whereby a slight rocking of the block of lenses on the spindle during the grinding operation will not affect the accuracy of the curve being generated on the lenses.

And, another object is to provide a chucking apparatus for a block of lenses which makes use of a principle adapted to the generation of both concave and convex curves on lens blanks.

The novel features that we consider characteristic of our invention are set forth in the appended claims. The invention itself, however,

2 both as to its organization and method of operation, together with additional objects and advantages thereof, will best be understood from the following description when read in connection with the accompanying drawings, in which Fig. 1 is a vertical section of a lens block chucking arrangement adapted for large convex hemisphere blocks constructed in accordance with a preferred embodiment of the present invention;

Fig. 6 is another modification of the present chucking arrangement adapted for chucking large concave blocks;

Fig. 7 is a section taken substantially on line 7—7 of Fig. 6; and

Fig. 8 is an enlarged elevational view of one form of locating stud adapted for use on the chucking arrangement shown in Fig. 6.

Like reference characters refer to corresponding parts throughout the drawings.

Figure 1:
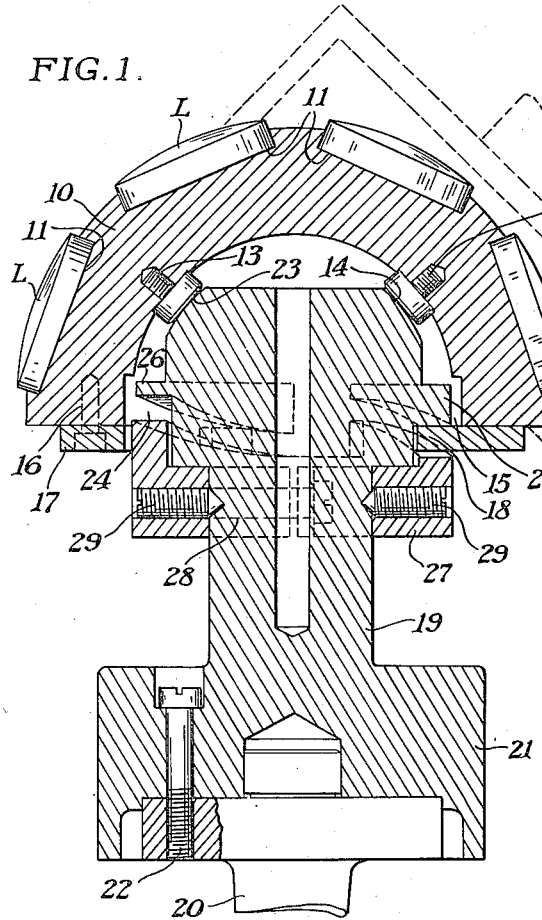
Figure 2:
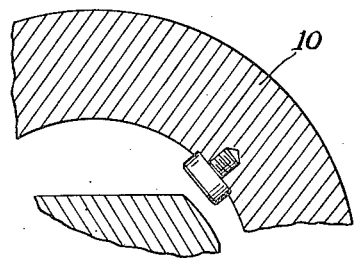
Fig. 2 is a partial sectional view corresponding to Fig. 1, and showing how the locating studs on the block are held in spaced relation with the locating surface on the chuck when the two parts are first brought into endwise relation, in order to prevent the locating studs from striking the locating surface with impact when the block is placed on the chuck.
Figure 3:
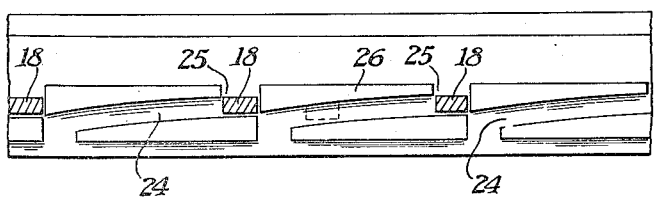
Fig. 3 is a developed view of the periphery of the chuck with the locking lugs on the block shown in the position they assume relative to the helical cam slots when the block is dropped onto the end of the chuck and prior to the two parts being relatively rotated to positively lock them together.

Referring now to Figs. 1–3, wherein a modification of the present invention is shown which is adapted for accommodating blocks in the form of large convex hemispheres, the hemisphere blocking tool 10 is made hollow and, as well known in the art, has a plurality of lens seats 11 spaced around its convex blocking surface in which lens blanks L are adapted to be fixed by pitch for the generation of a given convex curve on the exposed surface of each blank. As is well known in lens-generating machines, this block of lenses is mounted on a spindle to rotate about the axis thereof while an annular abrading tool, or wheel, having an abrasive charged face, is rotated in contact therewith about an axis inclined to that of the work spindle. Such a tool is shown at 12 in Fig. 1, and the angle which its axis makes with that of the work spindle, as well as the shape of the working face of the tool, is determined by the curve to be generated on the lens blanks carried by the blocking tool. The abrading wheel is fed toward the work along its own axis as the abrading takes place and until the desired curve and dimension are obtained on the work.

The inner surface of the hollow block is spot-faced to receive three hardened disks 13 with threaded stems which are screwed into three tapped holes in the block. These three hardened disks are so located in the block that the flat locating surface 14 of each is tangent to a sphere which is concentric to the curve to be generated on the lenses carried by the block. These locating flats 14 are preferably at an angle of 45° to the center line of the block, so as to provide minimum positioning errors at the top and bottom of the block of lenses. That portion of the recess in the block adjacent the bottom thereof is reamed out to provide a circular opening 15 extending part way into the hemispherical recess to accommodate a circular latching element on the chuck member, as will be hereinafter described. Fixed to the bottom of the block by screws 16 is a ring 17 which includes three locking lugs 18 extending radially into that portion of the recess including circular opening 15; said lugs preferably being spaced 120° relative to one another.

This blocking tool is adapted to be detachably connected onto the end of a mating chuck 19 which, in turn, is detachably fixed or permanently connected to the work spindle 20 of a generating machine to be rotated thereby. For purposes of illustration we have shown the chuck 19 including an adapter portion 21 of a shape and size to fit onto the end of a standard work spindle and be connected thereto by bolts 22 with the axes of the chuck and spindle in alignment with each other. The top end of the chuck includes a hardened and ground convex spherical locating surface 23 which is of the correct radius of curvature so that any tipping of the block with respect to the chuck while the locating disks rest against the sphere is a motion about the center of curvature and therefore introduces no thickness or prismatic errors in the lenses.

The chuck also includes three helical grooves 24 of suitable angle, such that the three lugs 18 on the bottom of the block are locked into these grooves by rotating the block with respect to the chuck, see Fig. 3. To permit the lugs 18 on the chuck to get into the helical grooves 24, there is a vertical slot 25 in the chuck at the end of each groove of such dimension as to accept said lugs. These three vertical slots 25 are 120° disposed relative to each other so that when the block is oriented relative to the chuck to line the lugs 18 thereon with the slots, then the block will drop down onto the chuck until the lugs 18 strike the bottom of the helical grooves. Thereafter, as the block is rotated relative to the chuck, the lugs 18 enter the grooves and the block of lenses is both positively locked on the chuck and drawn downwardly by the cam action of the grooves until the flats 14 on the locating studs 13 contact the spherical locating surface 23 on the end of the chuck. It is obvious that neither the lugs 18 nor the helical grooves 24 need be made with any great accuracy, since they serve merely to lock the block in place. Inaccuracies in these elements will tip the block slightly which is of no consequence because of the method of relatively locating the two with relation to the curve to be ground on the lenses.

The bottom of each helical groove directly below the vertical slot is so dimensioned that when the lugs 18 bear against the same, the locating flats 14, or studs 13, do not contact, but are spaced from the spherical locating surface 23. See Figs. 2 and 3. This avoids undue damage in wear between the locating surfaces, since the locating studs 13 are prevented from dropping down onto the locating surface 23 on the chuck when the block of lenses is pressed on the end of the chuck. Also, the locating studs 13 and locating surface 23 are brought into contact with a wiping action upon relative rotation of the block and chuck, and this wiping action tends to eliminate loose or adherent dirt which may be on these surfaces.

While the helical grooves 24 may be formed directly in the periphery of the chuck 19, if desired, in order to facilitate the manufacture of this part we have shown these grooves as made up of two separate parts. Looking at Fig. 1, the top wall of each helical groove is formed as a cam surface on the underside of a shoulder or flange 26 which is integral with the chuck. The lower or bottom surfaces of the cam grooves are formed on a split ring 27 which can be clamped to the shank of the spindle by a bolt 28 engaging ears on the adjacent ends of the ring. The ring 27 is located on the shank of the chuck in proper oriented and spaced position relative to the cam surfaces on the flange 26 by one or more set screws 29 in order to form, in combination with said cam surfaces 26, the helical cam grooves 24.

Figure 5:
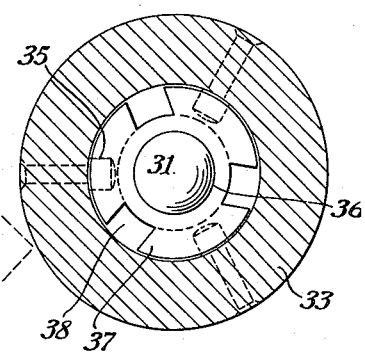
Fig. 5 is a section taken substantially on line 5—5 of Fig. 4.
Figure 4:
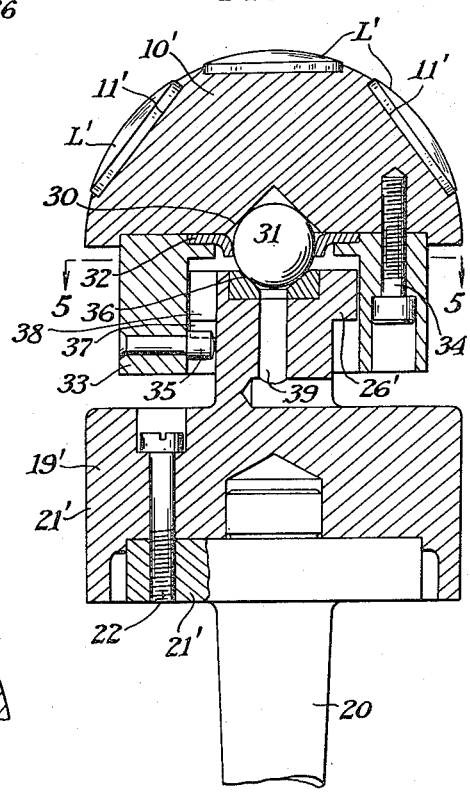
Fig. 4 is another modification of the present chucking arrangement adapted for chucking blocks in the form of small convex hemispheres.

Lens blocks in the form of small convex hemispheres may employ a different chucking construction than that shown in Figs. 1–3, but one involving the same principles. Such a chucking arrangement is shown in Figs. 4 and 5 and will now be described. As shown, the block 10' is a solid hemisphere with an accurate right circular conical seat 30 cut in the center of the bottom thereof. The convex spherical blocking surface of the blocking tool is provided with a plurality of lens seats 11' in which lens blanks L, which are to have a given convex spherical surface generated thereon, are attached by pitch. A steel ball 31 is held in the seat 30 by a washer 32 and flanged sleeve 33 combination; the sleeve being fastened to the bottom of the block by screws 34. Adjacent the lower end of this sleeve there are three locking pins 35 disposed around the sleeve at 120° relative to one another and extending radially inward of the sleeve to engage a three point helical lock on the chuck.

The chuck 19', as before, has an adapter portion 21' adapted to engage the end of a work spindle 20 of a generating machine and be fixed thereto by bolts 22. The chuck locating surface is a hardened and ground hollow right circular conical seat 36 set into the top of the chuck and into which the ball 31 is adapted to be seated when the block is slipped onto the end of the chuck. On the outside of the shank of the chuck there is a flange 26' having three helical cam surfaces 37 formed thereon; each cam surface extending substantially 120° around the shank. Three vertical slots 38 formed in the flange 26' at 120° relation permit the locking pins 35 to drop through the flange and engage the helical cam surfaces when the block is placed on the end of the chuck. Then, relative rotation of the block on the chuck moves the pins 35 into engagement with the cam surfaces to draw the block-locating ball 31 down into the conical seat in the chuck and positively lock the block to the chuck. The conical seat 36 is preferably made a 45° half angle to minimize errors due to dirt and wear. With a steep cone or a flat cone, a particle of dirt would cause a larger error in one direction than the actual size of the dirt particle. The shank of the chuck is provided with a right angle bore 39 placing the apex of the conical seat 36 in communication with the periphery of the chuck shank. This allows any dirt which might fall into the conical seat 36 to drop out the bottom thereof into the bore and from which it may be removed by a suction hose.

In Figs. 6–8, a chucking arrangement for handling concave blocking tools, and operating on the same principles as the other two, is shown. In this modification the blocking tool is in the form of a large concave blocking shell 40 on the concave surface of which are blocked a plurality of lens blanks 41 which are to have a given concave curve generated thereon. The outside or convex surface of the blocking shell is spotfaced, drilled and tapped at three equally spaced points and located at 45 degrees from the vertical axis of the block. Three hardened disks 42 with threaded stems and with the outer surface ground to a sphere of proper radius to be concentric to the block center of curvature are screwed into the tapped openings in the block. One of these disks is shown in Fig. 8.

Extending from the bottom of the blocking shell is a hollow sleeve 43 whose axis coincides with that of the vertical axis of the block, and extending radially from this sleeve are three locking lugs 44 disposed 120° relative to one another. The chuck, in this instance, comprises a cup-shaped member 45 which may be attached to the end of the spindle of a generating machine in a manner similar to that described in connection with the above-described modifications, but not specifically shown in Fig. 6. The upper end of the member 45 is inclined inwardly to make up a 45° half-angle hollow conical seat 50 on which the three disks 42 rest when the blocking shell is placed on the end of the chuck, see Fig. 7. Fastened to the inside walls of the member 45 is a locking flange 46 having three helical cam surfaces 47 formed on the bottom thereof, each cam surface extending substantially 120° around the flange. The flange is provided with three vertical slots 48 spaced 120° relative to one another and through which the locking lugs 44 on the sleeve 43 pass when the blocking shell is placed on the end of the chuck in proper oriented position. Thereafter, rotation of the block relative to the chuck brings the locking lugs 44 into cooperation with the helical cam surfaces 47 to draw the spherical surfaces of the disks 42 into firm contact with the conical seat 50 with a wiping action and to positively lock the two parts together.

We consider it novel to employ chucking arrangements for blocks of lenses in which the chucking surfaces are concentric to the curve to be generated on a lens-generating machine. While the modifications shown and described employ a pure kinematic solution to the geometric requirements, obviously a broader surface contact can be employed in which spherical locating disks fit against a chucking surface of the same curvature.

The disclosed chucking arrangements make possible the ready attachment and detachment of a block of lenses relative to the spindle of the lens-generating machine without the operator having to give any thought as to the proper location of the block on the work spindle of the machine. Inasmuch as the chucking surfaces are concentric to the curve to be generated, any possible movement of the block on the chuck will be concentric with the curve to be generated on the lenses and will not introduce prismatic or thickness errors. This fact eliminates the necessity of the cooperating latch elements on the block and chuck having to be precisely made. Furthermore, since one or more of the chucking surfaces is readily replaceable, when wear becomes apparent; namely, the locating disks in Figs. 1 and 6 or the ball 31 in Fig. 4, it is not necessary to ever replace the entire block structure for this reason. Inasmuch as the chucking surfaces are brought into engagement with a wiping action, the possibility of particles of dirt or abrasive becoming lodged between the two is practically eliminated.

Although we have shown and described certain specific embodiments of our invention, we are aware that many other modifications thereof are possible. Our invention, therefore, is not to be limited to the precise details of construction shown and described but is intended to cover all modifications coming within the scope of the appended claims.

Having thus described our invention, what we claim as new and desire to secure by Letters Patent of the United States is:

1. An apparatus for holding a plurality of lens blanks on the spindle of a generating machine for the generation of a given curve on one face of each blank and comprising in combination a blocking member having a spherical blocking surface on which a plurality of lens blanks are adapted to be fixed to have a given curve generated on the exposed surface of each, a chuck member adapted to be connected to the spindle of a generating machine in such a way that its longitudinal axis is parallel to that of said spindle, means for detachably connecting said blocking member on said chuck member with the longitudinal axis of the chuck member passing through the center of curvature of said spherical blocking surface and including male and female portions on opposite ones of said members, cooperable latch elements on said male and female portions positively connecting said members together and arranged to draw said two members together in an axial direction upon relative rotation thereof, and rigid locating surfaces on opposite ones of said members brought into engagement with each other through a wiping action by the coaction of said latch elements and defining the axial relation of said two members when connected together, one of said locating surfaces being a spherical surface whose center lies on a line substantially coincident with the longitudinal axis of the chuck member and having a curvature which is concentric to the curve to be generated on the lens blank.

2. Apparatus for holding a plurality of lens blanks on the spindle of a generating machine for the generation of a given curve on one face of each blank comprising in combination a blocking member having a spherical blocking surface on which a plurality of lens blanks are adapted to be fixed to have a given curve generated on the exposed surface of each, an annular sleeve on said blocking member with its longitudinal axis passing through the center of curvature of said spherical blocking surface, a chuck member including a portion adapted to pass through said sleeve when the block is mounted thereon, means for detachably connecting said blocking member on said chuck member and including cooperable latch elements on said sleeve and said chuck positively connecting the two parts together upon relative rotation thereof, one of said latch elements comprising a helical cam surface which serves to draw the two members together upon their relative rotation, and rigid locating surfaces on said blocking member and chuck member brought into engagement with each other upon attachment of the two members; the locus of one of said locating surfaces being defined by a spherical plane whose center of curvature lies substantially on a line coincident with the longitudinal axis of the chuck member and having a curvature which is concentric to the curve to be generated on the lens blanks.

3. Apparatus for holding a plurality of lens blanks on the spindle of a generating machine for the generation of a given convex curve on one face of each blank comprising in combination a substantially hemispherical blocking tool having a convex spherical blocking surface on which a plurality of lens blanks are adapted to be fixed to have said given convex curve generated on the exposed surface of each; the bottom surface of said tool provided with a recess symmetrical with respect to the diameter of said blocking surface which bisects the same and including a circular portion whose axis lies on said diameter, extending from the bottom of said tool a short distance, a plurality of flat locating surfaces extending into the bottom of said recess in spaced relation with one another and disposed so that they are each parallel to different planes tangent to the spherical surface to be generated on the lens blanks, and a chuck adapted to be connected to the spindle of a generating machine and including an end portion extending axially into said recess in said blocking tool when said tool is mounted thereon, a spherical convex surface on the end of said chuck concentric with said given curve to be generated on the blanks contacting said flat locating surfaces when the tool is mounted on said chuck, and cooperable latch elements on said tool and chuck positively connecting the two together and coacting to draw said convex surface on the end of said chuck into engagement with said flat locating surfaces when said two parts are latched together.

4. Apparatus for holding a plurality of lens blanks on the spindle of a generating machine according to claim 3, characterized by the fact that the cooperable latch elements on the tool and chuck comprise a helical cam surface on one of the parts and a lug on the other part adapted to be brought into cooperative engagement upon a relative rotation of the two parts, whereby the spherical convex surface on the end of the chuck and flat locating surfaces are adapted to be brought into engagement with a relative wiping action between the two.

5. Apparatus for holding a plurality of lens blanks on the spindle of a generating machine according to claim 3, in which said cooperable latch elements on the tool and chuck comprise a radial lug on one of the parts, a helical cam slot in the other part adapted to receive said lug and having a vertical slot at one end to allow said lug to drop down into alignment with said helical cam slot in one position of relative rotation of the two parts, the bottom of the helical slot opposite said vertical slot being so positioned that when the lug comes into engagement with the same the spherical convex locating surface on the chuck and the flat locating surfaces on the tool are held in spaced relation.

6. Apparatus for holding a plurality of lens blanks on the spindle of a generating machine according to claim 3 in which the flat locating surfaces in the bottom of the recess in said tool comprise three hardened disks having threaded stems screwed into the bottom of said recess and in which said cooperable latch elements comprise a helical cam slot formed in the cylindrical wall of said chuck and a vertical slot in said wall at the end of said helical cam slot and providing an entrance to said cam slot, and a lug on the bottom surface of said tool and extending radially into the circular portion of said recess and adapted to drop into said vertical slot into alignment with said helical cam slot in one position of rotative relative adjustment of the tool and chuck whereafter relative rotation of the tool and chuck causes said lug to move into said helical cam slot to draw the two parts together and positively lock them against axial separation.

7. Apparatus for holding a plurality of lens blanks on the spindle of a generating machine for the generation of a given concave curve on one face of each blank comprising in combination an arcuate blocking shell having a concave spherical blocking surface on which a plurality of lens blanks are adapted to be fixed to have said given concave curve generated on the exposed surface of each and having a convex surface, a plurality of locating disks mounted in spaced relation on the convex surface of said shell with their locating surfaces lying substantially in the same spherical plane; the locating surface of each disk consisting of a convex curve substantially concentric with the curve to be generated on said lens blanks, a chuck detachably connected to the spindle of a generating machine comprising an annular end portion whose axis coincides with the axis of rotation and with the radius of the blocking shell which bisects the blocking surface thereof when the shell is seated convex-side downward on the end thereof; the end of said annular portion being flat and inclined inwardly at a 45° half angle relative its axis, and cooperable latch elements on said blocking shell and chuck detachably connecting the two parts together, said latch elements coacting upon a relative rotation of the two parts to draw said parts together in an axial direction to bring said locating disks into engagement with said inclined portions on the end of the chuck with a wiping action.

8. Apparatus for holding a plurality of lens blanks on the spindle of a generating machine for the generation of a given convex curve on one face of each blank and comprising in combination a solid hemispherical blocking tool having a convex spherical blocking surface on which a plurality of lens blanks are adapted to be fixed in spaced relation to have said given convex curve generated on the exposed surface of each; the bottom surface of said tool provided with a right circular conical recess, the axis of which is perpendicular to the bottom of the tool and intersects the center of curvature of the curve to be generated; a sphere rotatably disposed in said recess with its center located on the axis of said recess and substantially at the center of curvature of the curve to be generated, a chuck adapted to be connected to the spindle of a generating machine to be rotated about its axis thereby, a right conical seat in the end of said chuck whose axis coincides with that of the chuck, means for detachably connecting said tool and chuck in endwise relation with said sphere seated in said conical seat with the axes of the two in alignment, said connecting means including cooperable latch elements on said tool and chuck movable relative to one another and coacting to draw said tool and chuck together in endwise relation to seat each of the conical recess and conical seat on said sphere.

9. Apparatus for holding a plurality of lens blanks on the spindle of a generating machine according to claim 8 characterized by the fact that the conical seat in the end of the chuck is made a 45° half angle to minimize errors due to wear and dirt.

10. Apparatus for holding a plurality of lens blanks on the spindle of a generating machine according to claim 8 characterized by the fact that the conical seat in the end of the chuck is made a 45° half angle to minimize errors due to wear and dirt and said chuck provided with a bore extending vertically from the apex of said conical seat and to the outside of the chuck and into which foreign matter which might enter said conical seat will fall and can be removed while the chuck is fixed to said spindle of the generating machine.

JOHN R. TURNER.
JOSEPH A. PELLMAN.

REFERENCES CITED

The following references are of record in the file of this patent:

UNITED STATES PATENTS

| Number | Name | Date |
|---|---|---|
| 1,194,793 | Styers | Aug. 15, 1916 |
| 1,965,692 | Dodge | July 10, 1934 |